J. BOGARDUS.
Vulcanizing Apparatus.
No. 4,278.
3 Sheets—Sheet 1.
Patented Nov. 21, 1845.
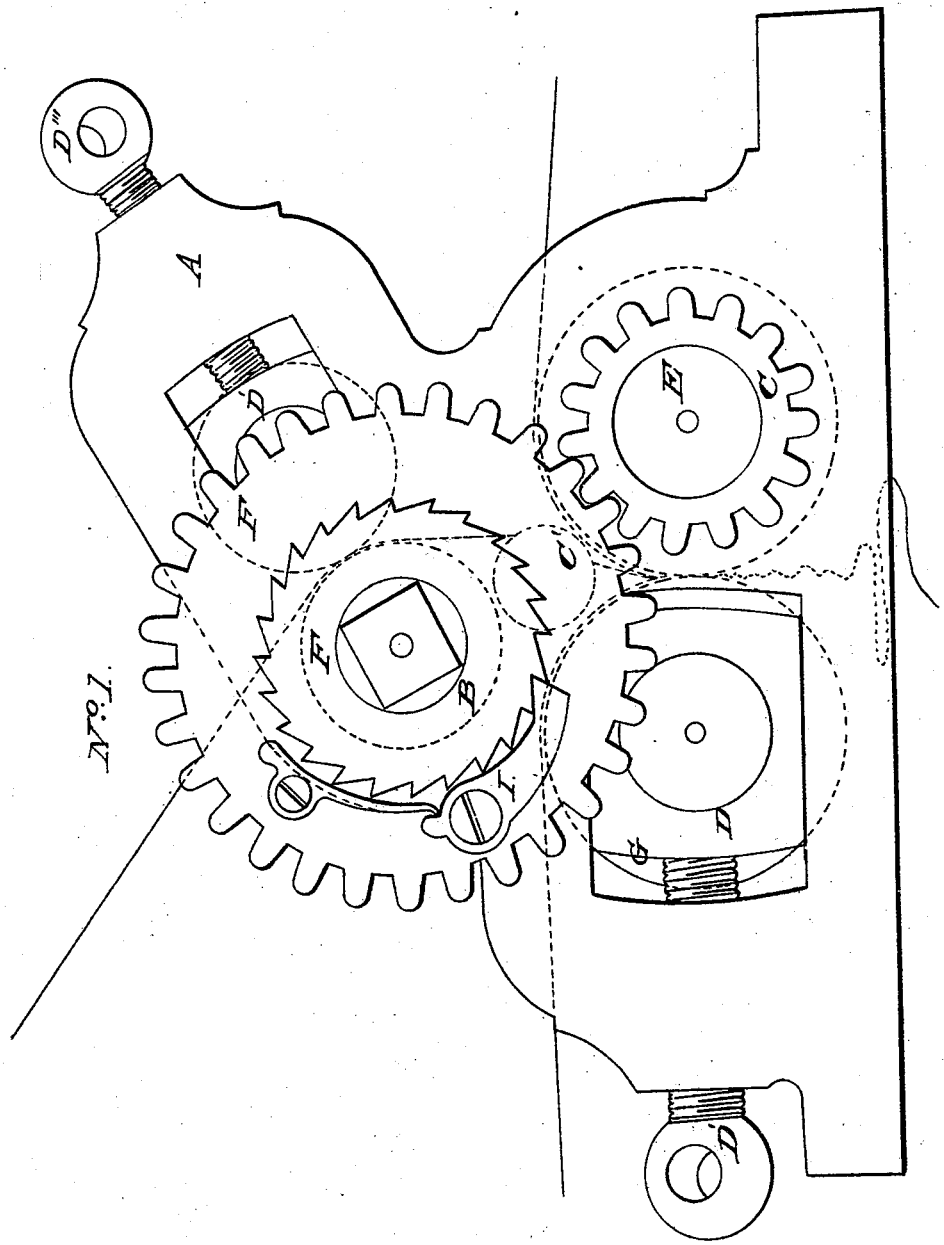

J. BOGARDUS.
Vulcanizing Apparatus.
No. 4,278.
3 Sheets—Sheet 2.
Patented Nov. 21, 1845.
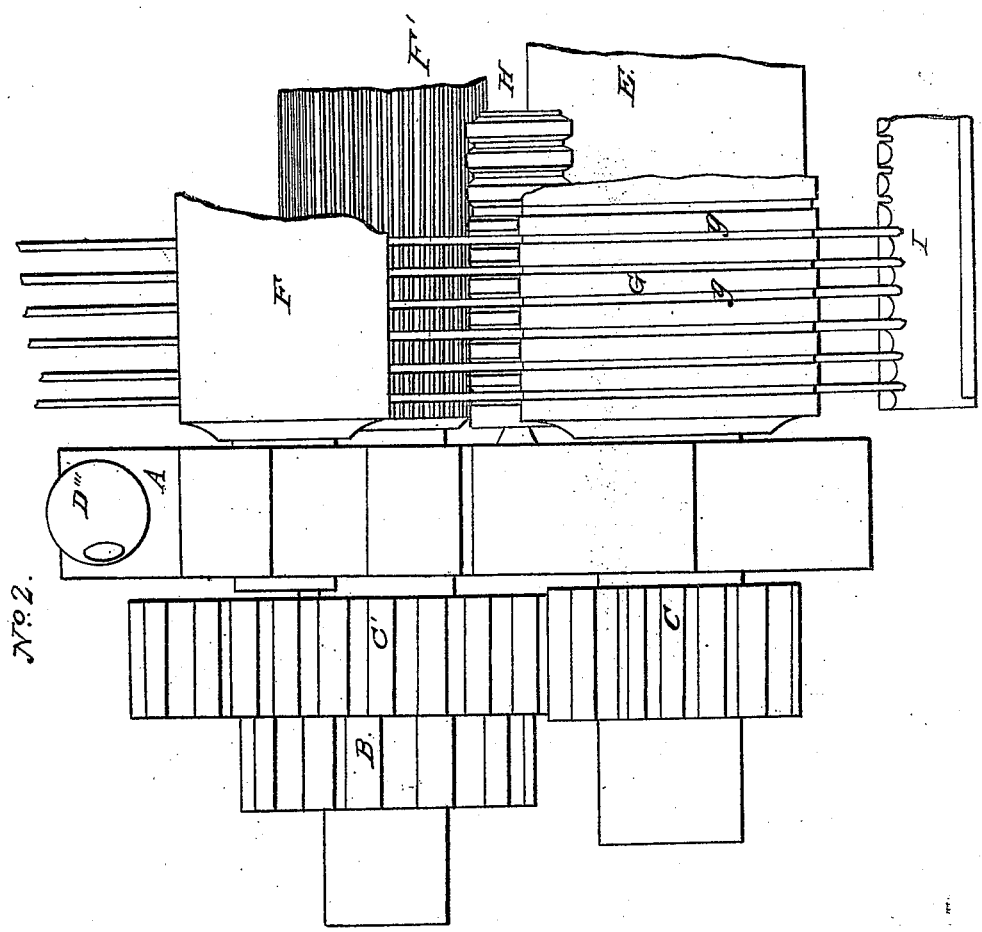

J. BOGARDUS.
Vulcanizing Apparatus.
No. 4,278.
3 Sheets—Sheet 3.
Patented Nov. 21, 1845.
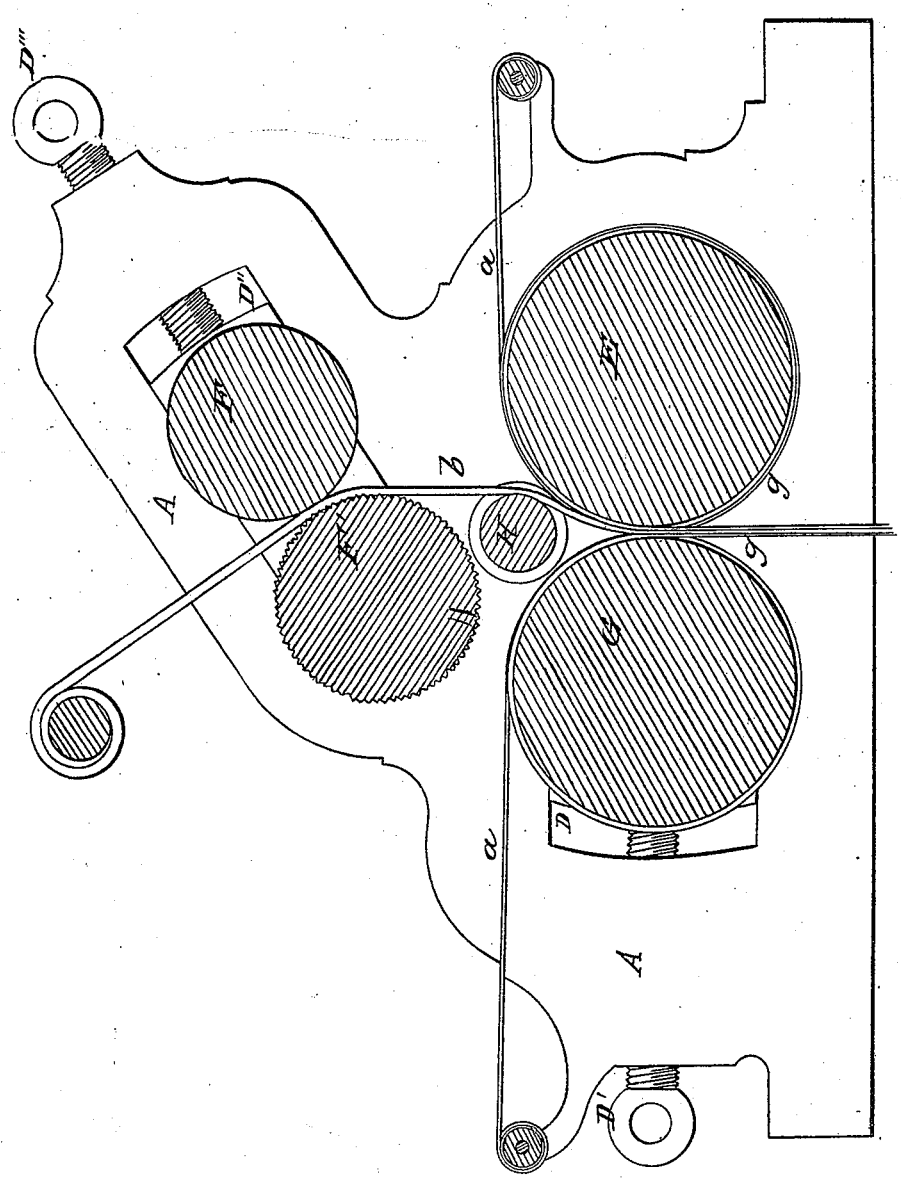

UNITED STATES PATENT OFFICE.

JAMES BOGARDUS, OF NEW YORK, N. Y.

SHIRRING-MACHINE.

Specification of Letters Patent No. 4,278, dated November 21, 1845; Antedated May 21, 1845.

*To all whom it may concern:*

Be it known that I, JAMES BOGARDUS, of the city, county, and State of New York, have invented new and useful Improvements in Machines for Making Shirred or Corrugated India-Rubber Fabrics, and that the following is a full, clear, and exact description of the principle or character thereof which distinguishes my invention from all other things before known and of the manner of making, constructing, and using the same, reference being had to the accompanying drawings, making part of this specification, in which—

Figure 1, Plate 1, is an elevation of the end of the machine; Fig. 2, Plate 1, a front elevation of a portion of the machine, and Fig. 3, Plate 2, a cross vertical section.

The same letters indicate like parts in all the sections.

Shirred or corrugated india rubber fabrics, which consist of strips or threads of india rubber laid between two pieces of cloth of any kind, have been heretofore made by passing the threads or strips of india rubber in a stretched state, and between two pieces of cloth (which have the surfaces that come together and embrace the strips of india rubber, prepared with india rubber cement) between two rollers covered with some elastic substance, (as patented by Horace M. Day,) to give the requisite pressure and cause the prepared surfaces of the pieces of cloth to adhere to the strips or threads of india rubber, and to each other. This mode of operation although a great and valuable improvement in the arts, makes an imperfect fabric, with the edges of the ribs, formed by the strips or threads of india rubber, of an irregular form, and rugged, and with the surfaces of the two pieces of cloth imperfectly connected between the strips of india rubber. But my improvements remedy these defects, and they consist first, in making the rollers, between which the fabric is formed, of metal or other hard substance with their surfaces grooved in the direction of their periphery to correspond with the number and size of the india rubber strips, and the spaces between them, the strips passing in the grooves and the two pieces of cloth being pressed together between them by the ridges, and the grooves being of such depth as to insure sufficient pressure to cause the pieces of cloth to adhere to the strips of india rubber. This mode of operation insures an equal pressure on the whole surface, and gives a perfect regularity to the ribs and the whole surface of the fabric, which cannot be attained by the elastic surfaces of the rollers as heretofore employed; for it must be evident that the pressure between the strips of india rubber, where it should be the greatest, must be less than on the strips when the pressure between depends, as it must, upon the indentations formed in the elastic surfaces of the rollers by the strips; and that the spaces between the ribs cannot be so regular when this depends upon guides in front of the rollers as when, in addition to the guides, the grooves in the pressure rollers always retain them at equal distances, at the same time preventing each individual strip from spreading out under the pressure. And my second improvement consists in connecting the feed rollers, (which supply the strips of india rubber at a velocity less than the passage of the completed fabric between the grooved rollers to stretch them,) with the gearing wheel which communicates the feeding motion by means of a ratchet to admit of turning back the feed rollers at the commencement of each operation for the purpose of stretching the length of strips between the feed rollers and the grooved pressure rollers.

In the accompanying drawings (A) represents a frame adapted to the operative parts of the machine, and (E, G) two rollers made of metal or other hard substance with grooves (*g*, *g*) cut into their surface of such depth, width and distance apart as to correspond with the size of the strips or threads of india rubber and the spaces between them. One of these rollers should be adjustable to regulate the distance between them for different qualities of fabric, and this may be effected by having the journals of one of the rollers work in sliding boxes (D) governed by set screws (D′) in manner well known to mechanics, and both, or only one of these rollers may be grooved, the former to form ribs on both surfaces of the fabric, and the latter on only one. The two pieces of cloth (*a, a*) which are to embrace the strips of india rubber, with one surface coated with india rubber, or other cement, pass over and between these two rollers (E, G), while the strips (*b*) of india rubber pass in between the two pieces of cloth and in the grooves of the rollers, the two pieces of cloth being pressed together between the strips by the surface of the rollers that project between the grooves. The strips (*b*) of india rubber are fed by two feed rollers (F, F'), one of which (F') should be fluted, and work in fixed bearings, while the other turns in sliding boxes (D'') regulated by temper screws (D'''), or powerful springs, to grip and prevent the strips from slipping, and between the feed and the pressure rollers the strips pass over a grooved guide roller (H) to insure their entrance in the grooves of the pressure rollers. Motion is communicated by any desired means from some first mover to the roller (E), on the shaft of which there is a cog wheel (C) which communicates motion to the fluted feed roller F' means of a larger cog wheel (C') connected with its shaft by a ratchet wheel (B) (permanently attached to it) and claw or pawl, *c* so that the cog wheel will carry the feed roller in one direction while the ratchet will admit of its turning freely in the reverse direction to stretch the strips or threads of india rubber at the commencement of each operation. The relative diameter of the two cog wheels should be regulated to suit the extent to which the india rubber is to be stretched, or the same end may be attained by having the cog wheels of equal diameter and the grooved pressure rollers of greater diameter than the feed rollers, as the object is to make the periphery of the feed rollers travel with less velocity than the grooved pressure rollers. The two grooved pressure rollers may be geared together, if desired, or one may be carried by the other, by the friction of their surfaces, and so of the feed rollers.

What I claim as my invention and desire to secure by Letters Patent, is—

1. The method herein described of uniting the various parts in making shirred or corrugated india rubber fabrics by passing the cloth and strips of india rubber between pressure rollers, one or both of which is grooved in the manner described to receive the strips of india rubber, and make pressure on the cloth between the strips, as herein described.

2. And I also claim connecting the driving feed roller with the gearing which drives it by means of a ratchet to admit of turning it back to stretch the strips of india rubber, when this is combined with pressure rollers, the peripheries of which move with greater velocity than that of the feed rollers, as herein described.

JAMES BOGARDUS.

Witnesses:
W. B. MACLAY,
ARCHIBALD MACLAY, Jr.